United States Patent
Liu

(10) Patent No.: US 12,002,050 B2
(45) Date of Patent: Jun. 4, 2024

(54) APPARATUS AND METHOD OF AUTHORISATION

(71) Applicant: Arm Limited, Cambridge (GB)

(72) Inventor: Yongkang Liu, Shanghai (CN)

(73) Assignee: Arm Limited, Cambridge (GB)

( * ) Notice: Subject to any disclaimer, the term of this patent is extended or adjusted under 35 U.S.C. 154(b) by 97 days.

(21) Appl. No.: 17/251,422

(22) PCT Filed: Jul. 5, 2019

(86) PCT No.: PCT/GB2019/051918
§ 371 (c)(1),
(2) Date: Dec. 11, 2020

(87) PCT Pub. No.: WO2020/012165
PCT Pub. Date: Jan. 16, 2020

(65) Prior Publication Data
US 2021/0224815 A1 Jul. 22, 2021

(30) Foreign Application Priority Data
Jul. 11, 2018 (CN) .......................... 201810793402.X

(51) Int. Cl.
*G06Q 20/40* (2012.01)
(52) U.S. Cl.
CPC .............................. *G06Q 20/40145* (2013.01)
(58) Field of Classification Search
None
See application file for complete search history.

(56) References Cited

U.S. PATENT DOCUMENTS

| | | | | |
|---|---|---|---|---|
| 8,550,339 | B1* | 10/2013 | Newman | G07C 9/37 340/5.82 |
| 2002/0099664 | A1* | 7/2002 | Cohen | G06Q 20/3825 705/67 |
| 2006/0224645 | A1* | 10/2006 | Kadi | G06F 3/0238 708/200 |
| 2006/0282395 | A1* | 12/2006 | Leibowitz | G06Q 20/3674 705/67 |
| 2013/0232066 | A1* | 9/2013 | Taveau | G06Q 20/40145 705/44 |

(Continued)

OTHER PUBLICATIONS

Grother, P., Salamon, W., & Chandramouli, R. (2013). Biometric specifications for personal identity verification. NIST Special Publication, 800, 76-2. (Year: 2013).*

(Continued)

*Primary Examiner* — Daniel S Felten
*Assistant Examiner* — Claire A Rutiser
(74) *Attorney, Agent, or Firm* — NIXON & VANDERHYE P.C.

(57) ABSTRACT

An apparatus adapted to authorise a transaction having a requested payment amount comprises receiving circuitry to receive a request to authorise the transaction, the request indicating the requested payment amount of the transaction, input circuitry to receive one or more user inputs required from the user to authorise the transaction and authorising circuitry to authorise the transaction when the one or more user inputs correspond to a user input payment amount that is the same as the requested payment amount of the transaction.

12 Claims, 6 Drawing Sheets

(56) References Cited

U.S. PATENT DOCUMENTS

| | | | |
|---|---|---|---|
| 2013/0265136 A1* | 10/2013 | Wadia | G07F 19/201 |
| | | | 340/5.53 |
| 2014/0172707 A1* | 6/2014 | Kuntagod | G06Q 20/405 |
| | | | 705/44 |
| 2015/0046340 A1 | 2/2015 | Dimmick | |
| 2015/0120573 A1 | 4/2015 | Xia | |
| 2015/0227937 A1* | 8/2015 | Giles | G06Q 20/3278 |
| | | | 705/44 |
| 2015/0332273 A1* | 11/2015 | Bruno | G06Q 20/40145 |
| | | | 705/44 |
| 2018/0332036 A1* | 11/2018 | Mokhasi | H04L 9/3231 |
| 2019/0019190 A1* | 1/2019 | Agrawal | G06Q 20/40145 |

OTHER PUBLICATIONS

International Search Report and Written Opinion of the ISA for PCT/GB2019/051918 dated Aug. 9, 2019, 13 pages.
Office Action for CN Application No. 201810793402.X issued Mar. 1, 2024 and English translation, 21 pages.

* cited by examiner

| User Input | Numeral |
|---|---|
| 1st finger | 1 |
| 2nd finger | 2 |
| 3rd finger | 3 |
| 4th finger | 4 |
| 5th finger | 5 |
| 6th finger | 6 |
| 7th finger | 7 |
| 8th finger | 8 |
| 9th finger | 9 |
| 10th finger | 0 |

FIG. 2

APPARATUS AND METHOD OF AUTHORISATION

This application is the U.S. national phase of International Application No. PCT/GB2019/051918 filed Jul. 5, 2019 which designated the U.S. and claims priority to CN Patent Application No. 201810793402.X filed Jul. 11, 2018, the entire contents of each of which are hereby incorporated by reference.

TECHNICAL FIELD

The present disclosure relates to an apparatus and method of authorisation. More particularly it relates to authorisation and enhancing security according to one or more user inputs provided by the user.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

As a background technology, passwords are often used to enable authorised access to electronic media such as computer programs or websites. However, a variety of different techniques can be used by hackers to obtain a user's password, and anybody with knowledge of the user's password can be granted access to the user's account.

In the field of transaction security, secure payment applications exist such as Alipay and PayPal which can allow the user to conduct online transactions using a user account that can be accessed by authorisation credentials. The secure payment application can receive payment requests from other third party applications that request the payment application to authorise the transaction. A range of different third party applications may setup a payment request which can be received by the secure payment application, and the user can authorise the payment request by providing the authorisation credentials to the secure payment application service to complete the transaction.

However, there exist a wide range of different third party applications that can setup a payment request with the secure payment application, and the security of such third party applications cannot always be guaranteed to be robust. In particular, hacking of the user-interface could make it possible for the user to be shown one amount while requesting authorisation for a transaction of a different amount. It is desirable to enhance security when authorising transactions.

SUMMARY

Aspects of the present technique are set out in the claims.

BRIEF DESCRIPTION OF THE DRAWINGS

The present invention will be described further, by way of example only, with reference to embodiments thereof as illustrated in the accompanying drawings, in which:

FIG. 2 is a schematic diagram showing an example of a predetermined mapping used to associate user inputs with respective numerals.

DESCRIPTION OF EXAMPLE EMBODIMENTS

Particular embodiments will now be described with reference to the figures.

Figure 1:
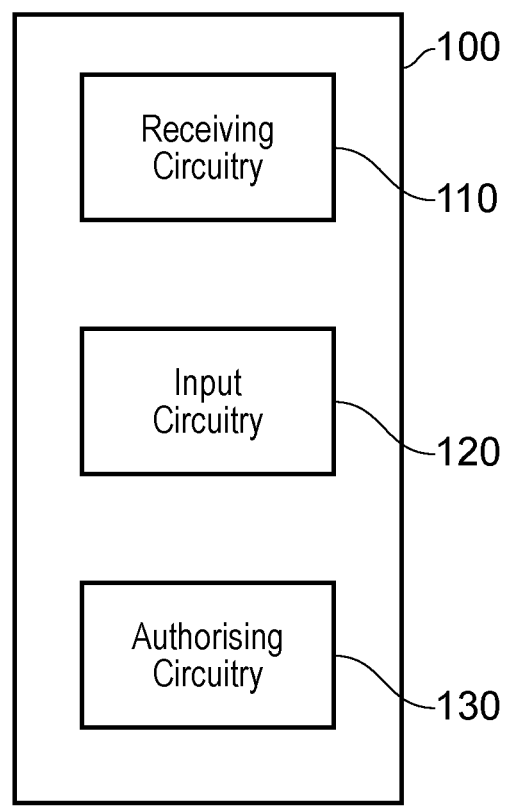
FIG. 1 is a schematic diagram showing an apparatus adapted to authorise a transaction in accordance with embodiments of the present disclosure.

Referring now to FIG. 1, in embodiments of the disclosure an apparatus 100 adapted to authorise a transaction having a requested payment amount comprises receiving circuitry 110 to receive a request to authorise the transaction, the request indicating the requested payment amount of the transaction, input circuitry 120 to receive one or more user inputs required from the user to authorise the transaction, and authorising circuitry 130 to authorise the transaction when the one or more user inputs correspond to a user input payment amount that is the same as the requested payment amount of the transaction. The receiving circuitry 110 can be any circuitry capable of receiving the request to authorise the transaction via a wired and/or wireless communication, and can be adapted to receive encrypted information via an encrypted communication with another information processing apparatus. The receiving circuitry 110 can receive information for a transaction which is to be authorised by a user, where the information may be communicated to the receiving circuitry 110 by an application running on either the apparatus 100 or on another information processing apparatus. It will be appreciated that the application that communicates the request to the receiving circuitry 110 can be a third party application and can take a variety of different forms.

The application can request payment of a requested payment amount by the user in order to complete the transaction, and the request for authorisation of the transaction can be communicated to the apparatus 100 for authorisation of the request by the user. The secure application can thus setup a request for the user to authorise the transaction and the receiving circuitry 110 can be configured to receive the request for authorisation of the transaction which comprises information indicating the requested payment amount for the transaction. For example, the user can identify and select one or more items available for purchase from a third party application and the receiving circuitry 110 can receive one or more requests associated with the one or more items selected by the user which request the user to authorise one or more transactions. The third party application can thus send the request to the receiving circuitry 110 and the apparatus 100 can identify the requested payment amount that will be paid by the user when the transaction is authorised.

The input circuitry 120 can be configured to receive one or more user inputs which are required from the user in order to authorise the transaction. The receiving circuitry 120 can be any circuitry configured to receive the one or more user inputs provided by the user, where the user inputs can be provided via a range of different techniques. For example, the input circuitry 120 may receive a user input corresponding to an input entered by the user pressing a button (e.g. keyboard or conventional computer mouse), or performing a gesture (e.g. hand gesture, head movement), or tracking a user's gaze, or providing a particular biometric (e.g. a biological metric that is characteristic of specific portion of the user's body). The user can thus provide one or more user inputs to the input circuitry 120 using different techniques, and the one or more user inputs received by the input circuitry 120 may comprise respective inputs that correspond to different input technologies. In some cases a first user input may correspond to an input received via a keyboard (e.g. pressing a button), a second user input may correspond to an input received via a camera (e.g. gesture recognition) and a third user input may correspond to an input received via biometric detection.

The authorising circuitry 130 can be configured to authorise the transaction when the one or more user inputs correspond to a user input payment amount that is the same as the requested payment amount of the transaction. The authorising circuitry 130 can be any circuitry configured to carry out a processing operation and can perform one or more processing operations in dependence upon the requested payment amount received by the receiving circuitry 110 and the one or more user inputs received by the input circuitry 120. It will be appreciated that the authorising circuitry 130 can be operated in accordance with the receiving circuitry 110 and the input circuitry 120 based on a secure communication link between the receiving circuitry 110, the input circuitry 120 and the authorising circuitry 130.

The authorising circuitry 130 can determine a user input payment amount in accordance with the one or more user inputs received by the receiving circuitry 120. In other words, the authorising circuitry 130 can analyse the properties of the one or more user inputs and determine a payment amount that is input by the user, such that the payment amount corresponds to the one or more user inputs. In this way, the authorising circuitry 130 can analyse the one or more user inputs and the one or more user inputs can be expressed in terms of a payment amount. Consequently, the user can provide inputs to the apparatus 100 where each input may correspond to an amount associated with a transaction or where each input may correspond with a range into which an amount associated with the transaction falls. For example, the user can provide an input by pressing a button on a keyboard corresponding to the number 5, which in some examples may correspond to a user input payment amount having a value in the range $5-$5.99. In some examples, the user may provide an input by pressing a first button on the keyboard corresponding to the number 7 and a second button on the keyboard corresponding to the number 0, which corresponds to a user input payment amount in the range $70-$79.99. Note that there is no need for the ranges to be linear. For instance, at low values, each range could be of high granularity whereas at higher values, the range could have much lower granularity (or even vice-versa). Alternatively or in addition, the user can provide an input by performing a gesture such as a left-hand wave which may correspond to the number 10. Alternatively or in addition, the user can provide an input by providing a biometric input such as a first finger print which may correspond to the number 8. It will be appreciated that any user input can be associated with any number, and the user can provide any number of respective inputs in order to achieve a user input payment amount of any value. Hence more generally, the user may provide one or more respective user inputs and the respective inputs may each correspond to a respective numeral (e.g. in base 10) such that the combination of respective user inputs corresponds to a combination of respective numerals that represents the user input payment amount provided by the user.

In embodiments of the disclosure the one or more user inputs comprise one or more biometric inputs provided by the user. The input circuitry 120 can be adapted to receive one or more of the user inputs by detecting one or more biometric inputs provided by the user. Alternatively or in addition, the input circuitry 120 can be adapted to receive one or more of the user inputs based on information communicated to the input circuitry 120 by a biometric sensor such as an image sensor. For example, the biometric sensor can be configured to detect one or more biometric inputs and the biometric sensor can communicate information associated with the one or more biometric inputs to the input circuitry 120, so that the input circuitry 120 receives one or more user inputs comprising one or more biometric inputs provided by the user. Therefore, the input circuitry 120 can be adapted to receive the one or more user inputs and at least one of the user inputs corresponds to a biometric input provided by the user. For example, the input circuitry 120 may receive three respective user inputs provided by the user, and in some cases the three respective user inputs may all be biometric inputs, or alternatively the three respective inputs may comprise one biometric input and two non-biometric inputs.

It will be appreciated that the biometric inputs can be provided by the user according to a range of different techniques for identifying unique biological traits of a user. The biometric inputs may be obtained from the user using one or more image sensors to detect one or more biological characteristics such as one or more of the user's respective fingerprints. Alternatively or in addition, the one or more image sensors can detect one or more properties associated with the user's eyes. In some cases the one or more image sensors can detect one or more properties associated with the user's face in order to perform facial recognition for the user by capturing face biometrics. In this way facial recognition may be performed whilst the user provides one or more non-biometric inputs so as to ensure that the non-biometric inputs are provided by the user and not another user. Alternatively or in addition, when providing the respective user inputs, a predetermined time period (e.g. 1, 2, 3, 4 or 5 seconds) between receiving a non-biometric input and receiving a biometric input provided by the user can be used to determine whether or not to accept the non-biometric input as a user input.

In this way, the authorising circuitry 130 can determine a user input payment amount in accordance with the one or more user inputs received by the receiving circuitry, and rather than entering a user input payment amount using a keyboard, this arrangement can allow the user to provide the user input payment amount based on a correspondence relationship between biometric inputs and numerals forming the user input payment amount. Therefore, each numeral that is provided by the user can be authenticated based on one or more biological characteristics of the user which thereby provides enhanced security. Consequently, biometric inputs that match the user's pre-registered biometric data are capable of providing numerals which form the user input payment amount provided by the user for authorising the transaction. Since the biometric inputs to be provided by the user are determined based on the requested payment amount, this gives the user less control over the specific biometric input that will be requested. Since, in addition, a biometric input might be expected to be difficult to fraudulently provide, by requiring a user to provide specific biometric inputs based on the requested payment amount, a user may have to be prepared to provide any of a selection of different possible biometric inputs, thereby leading to a greater degree of security.

In embodiments of the disclosure the one or more biometric inputs provided by the user comprise one or more from the list consisting of: a finger sample; an iris sample; a retina sample; and a voice sample. A finger sample comprising one or more characteristic properties of a fingerprint and/or one or more characteristic properties of a vein pattern inside a finger can be received by the input circuitry 120. In embodiments of the disclosure the input circuitry 120 comprises one or more from the list consisting of: one or more sensors to detect a fingerprint of a user; one or more image sensors to detect at least one of a retina and an iris of a user; and one or more audio sensors configured to detect a voiceprint of a user. The one or more sensors to detect the fingerprint of the user can comprise at least one of an image sensor, an ultrasound sensor and a capacitance sensor. The one or more ultrasonic sensors can be used to detect a user's fingerprint based on ultrasound imaging techniques that detect ultrasonic waves reflected from the surface of the finger structure. The one or more capacitance sensors can detect ridges and valleys (patterns) of the user's fingerprint when the finger contacts the sensor based on measurements electrical properties that vary across the user's fingerprint. The capacitance sensor comprises a plurality of respective read-out channels (pixels) that can each sense an electrical property associated with the fingerprint to identify patterns in the user's fingerprint.

The one or more image sensors can detect biometric patterns associated with a fingerprint and/or biometric patterns associated with finger veins (i.e. veins inside the finger) such that a fingerprint biometric and/or a finger vein biometric can be detected for each respective finger of the user. Alternatively or in addition, an iris sample comprising one or more characteristic properties (unique patterns) of the user's iris can be received by the input circuitry 120. The one or more image sensors can be adapted to detect unique patterns in the iris of the user's eyes such that an iris sample can be detected for each of the user's eyes. Alternatively or in addition, a retina sample comprising one or more characteristic properties (unique patterns of retina blood vessels) of the user's retina can be received by the input circuitry 120. The one or more image sensors can be adapted to detect unique patterns in the retina of the user's eyes such that a retina sample can be detected for each of the user's eyes. Alternatively or in addition, a voice sample comprising one or more characteristic properties (unique patterns of a voice) of the user's voice can be received by the input circuitry 120. An audio sensor can be configured to detect one or more voiceprints of the user (e.g. a sound spectrogram) and the voice sample comprising the voiceprint can be received by the input circuitry 120.

In embodiments of the disclosure the authorising circuitry 130 is adapted to authenticate each of the one or more biometric inputs provided by the user. In this way the input circuitry 120 can receive one or more user inputs, which comprise at least one biometric input, and the authorising circuitry 130 can authenticate each biometric input, based on biometric data stored for the user, to determine whether or not the biometric input was provided by the user or another user. Therefore, one or more user inputs can be received by the input circuitry 120 and the authorising circuitry 130 is adapted to authorise the transaction if the received biometric inputs are authorised (i.e. match the biometric data stored for the user) and the one or more user inputs correspond to a user input payment amount that is the same as the requested payment amount of the transaction.

In embodiments of the disclosure the authorising circuitry 130 is adapted to associate each respective user input with a respective numeral according to a predetermined mapping of one or more user inputs to one or more numerals. As discussed previously the respective user inputs received by the input circuitry 110 may each correspond to a respective numeral, and the combination of respective user inputs corresponds to a combination of respective numerals that represents the user input payment amount that is provided by the user. The authorising circuitry 130 is adapted to associate each user input with a respective numeral using a predetermined mapping, such that a respective numeral can be assigned to a respective user input. For example, based on the predetermined mapping the authorising circuitry 130 may assign the numeral 3 to the biometric input corresponding to the fingerprint of the user's third finger. This means that when the user provides the fingerprint of the third finger, the input circuitry 120 can receive the user input and the authorising unit 130 can associate the input with the numeral 5, based on the mapping, such that the input corresponds to an input payment amount of $5 (it will be appreciated that other currencies can be used). In some examples, each respective user input is mapped to a respective numeral in the range from 0-9, such that a user input can be mapped to one of ten possibilities (base-10). In this way, each of the user's fingerprints can be mapped to a different numeral in the range 0-9. In some cases, a predetermined user input (such as the iris of the user's left eye) can be mapped to a numeral in the range 0-9 or may be mapped to a numeral representing a larger number such as 10 or 100. Hence more generally, the authorising circuitry 130 can assign a first numeral to a first user input and a second numeral to a second user input in accordance with the predetermined mapping, and the combination and ordering of the respective user inputs corresponds to a user input payment amount represented by the first numeral and the second numeral.

FIG. 2 shows an example of a mapping table that can be used by the authorising circuitry 130 to associate each respective user input with a respective numeral according to the predetermined mapping of user inputs to numerals. The mapping table shown in FIG. 2 illustrates a mapping of the numerals 0-9 to the user inputs provided by the user's respective fingers. Therefore, when the user provides their first finger as the user input, the authorising circuitry 130 can associate the biometric input of the first finger with the numeral 1, and when the user provides their seventh finger as the user input, the authorising circuitry 130 can associated the biometric input of the seventh finger with the numeral 7. Therefore, the authorising circuitry 130 can be adapted to map one or more user inputs to one or more numerals, and the authorising circuitry 130 can authorise the transaction when the one or more user inputs correspond to a user input payment amount that is the same as the requested payment amount of the transaction. For example, when the user provides the $3^{rd}$ finger, then the $6^{th}$ finger and then the $10^{th}$ finger, the input circuitry 120 can receive the three respective user inputs and the authorising circuitry 130 can associate each respective input with a numeral according to the predetermined mapping defined by the mapping table. As such, the authorising circuitry 130 can associate the respective user inputs with respective numerals, and the order in which the user inputs are received by the input circuitry 120 determines the order of the numerals with respect to each other. Therefore a user input payment amount is obtained based on the ordering of the respective numerals, such that the $3^{rd}$ finger, the $6^{th}$ finger and then the $10^{th}$ finger correspond to a user input payment amount of $360 in accordance with the mapping shown in FIG. 2.

As part of an initial registration process the user may be requested to provide one or more biometric inputs which can be stored by the apparatus 100 for comparison with one or more biometric inputs provided by the user when authorising a transaction. In this way, a plurality of biometric inputs, such as each of the user's fingerprints, may be collected for the user in advance and subsequently used when performing authentication processing for a transaction. It will be appreciated that the mapping table may take a range of different forms and other biometric inputs such as the left iris or the right iris can also be mapped to a numeral. For example, the left iris can be mapped to the numeral 100, for example, such that the user can provide a user input payment amount of $100 based on an iris sample, rather than providing the first finger, then the $10^{th}$ finger, and then the $10^{th}$ finger again, which requires three respective biometric inputs to be authenticated by the authorising circuitry 130. Alternatively or in addition, further inputs could be required for payment amounts of certain types. For instance, in the above example, as well as providing the third, sixth and tenth fingerprints, the user may be requested to provide an iris sample as a consequence of the amount also being over $200.

In embodiments of the disclosure the predetermined mapping of one or more user inputs to one or more numerals can be determined by a user defined mapping table. The mapping table illustrated in FIG. 2 can take a range of different forms and the user can, as part of an initial setup procedure, select which user input corresponds to which numeral so that the mapping of user inputs to numerals can be adapted to be user specific. Therefore, the user can choose which numeral in the range 0-9 is assigned to which user input. In addition to the requirement for each biometric input to be authorised by the authorising circuitry 130, this can provide enhanced security for authorisation of transactions as the mapping of user inputs to numerals for the user's account may be specific to the user and may only be known by the user similar to how a user can have a user specific password. In such examples, a user could store a hint to be provided at a time where authorisation is sought in order to remind them of the mapping used.

Figure 3:
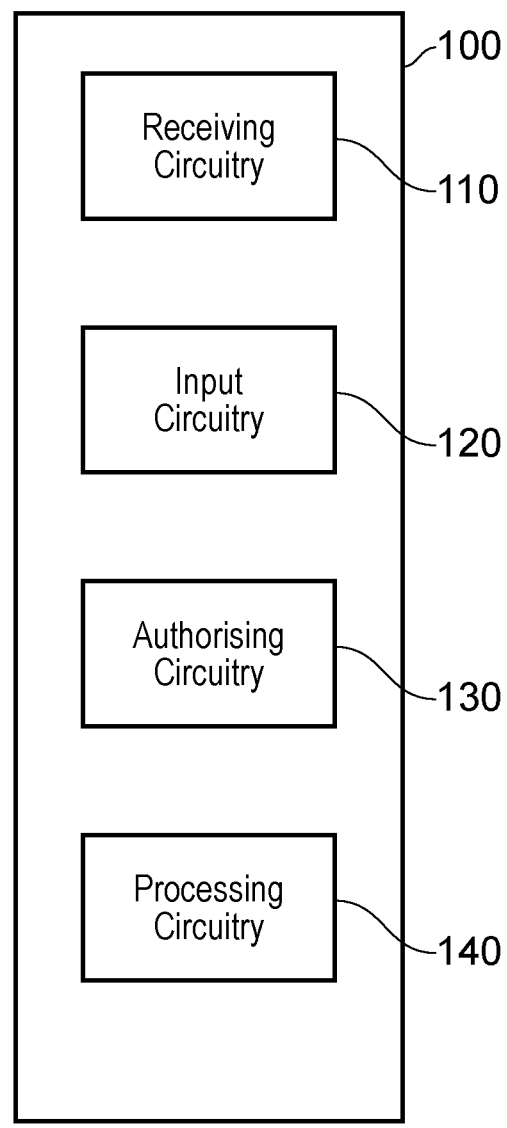
FIG. 3 is a schematic diagram showing an apparatus comprising processing circuitry adapted to generate an image in accordance with embodiments of the present disclosure.

Referring now to FIG. 3, in embodiments of the disclosure the apparatus 100 comprises processing circuitry 140 to generate an image to display an indicated payment amount of the transaction. As discussed previously, the receiving circuitry 110 can receive a request for authorisation of a transaction which comprises information indicating the requested payment amount for the transaction. The processing circuitry 140 can generate an image to display an indicated payment amount of the transaction, such that the user can view the image and is thus informed of the value of the indicated payment amount for the transaction. Therefore, the user can select one or more items available for purchase from an application and the receiving circuitry 110 can receive one or more requests for authorisation of one or more transactions associated with the one or more selected items. The processing circuitry 140 can thus generate an image to display the indicated payment amount of the transaction that is to be authorised by the user, and if the indicated payment amount is different to what the user expected when viewing the item(s) for purchase from the application, then the user is made aware that authorisation of the transaction will result in a payment of an amount that is different to what the user expected.

For example, the application may indicate to the user that a particular item has a price of $50. The user may select the item and the receiving circuitry 110 can receive one or more requests from the application for authorisation of the transaction associated with the selected item. The processing circuitry 140 can generate the image to display the indicated payment amount of the transaction to the user and if the indicated payment amount is not $50 then the user is informed, by viewing the image generated by the processing circuitry 140, that the transaction is for an amount that is different to what the user expected. This may be the case where the user interface (display image) of the application has been hacked to display a payment amount (e.g. $50) that is different to the payment amount (e.g. $100) that is to be authorised for the transaction. Therefore, whilst the payment request that is setup by the application may be for a first amount, the amount displayed by the user interface of the secure application can be hacked to be a second amount that is different to the amount requested by the payment request that is setup by the secure application. For example, the user interface of the secure application could be hacked to display $50 for an item whereas the payment request for the item that is setup by the application and received by the receiving circuitry 110 actually has a requested payment amount of $100. Consequently, the user is being requested to authorise a transaction for $100 whereas the user understands, from the application user interface, that the transaction is for $50. Therefore, the processing circuitry 140 can generate the image to display the indicated payment amount of the transaction to the user, and the user can verify whether the indicated payment amount is the same as the payment amount that the user expected.

However, it is possible that the application, which sets up the payment request, can be hijacked so that the information received by the receiving circuitry 110 is falsified. The processing circuitry 140 may thus generate the image, based on the falsified information, to display an indicated payment amount that is the same as the amount expected by the user when viewing the hacked user interface of the application, whilst the requested payment amount that is to be authorised for the transaction is not the same as the indicated payment amount. In this case, the indicated payment amount displayed to the user is not the same as the requested payment amount that is to be authorised for the transaction. However, when the user views the indicated payment amount the user can provide the one or more user inputs in order to provide a user input payment amount that is the same as the indicated payment amount (i.e. the user enters an input payment amount that is the same as the indicated payment amount). Consequently, if the indicated payment amount is not the same as the requested payment amount then the transaction will not be authorised. This is because the authorising circuitry 130 requires the one or more user inputs to corresponds to a user input payment amount that is the same as the requested payment amount of the transaction in order to authorise the transaction.

For example, the falsified information received by the receiving circuitry 110 from the application may be such that the processing circuitry 140 generates the image to display an indicated payment amount of $50 whereas the requested payment amount of the transaction is $100, such that authorisation of the transaction will authorise a payment of $100 when the user is actually expecting to authorise a transaction for $50. In this example, the user will therefore provide the one or more user inputs corresponding to a user input payment amount of $50 (e.g. the user may provide their fifth finger then their tenth finger based on the mapping illustrated in FIG. 2). The authorising circuitry 140 can authenticate each biometric input and can associate the user inputs with the user input payment amount of $50 based on the predetermined mapping. Consequently, the authorising circuitry 130 can establish that the user input payment amount (i.e. the amount the user has input and is expecting to pay) is not the same as the requested payment amount ($100) for the payment request, and therefore the authorising circuitry 140 will not authorise the transaction.

Figure 4:
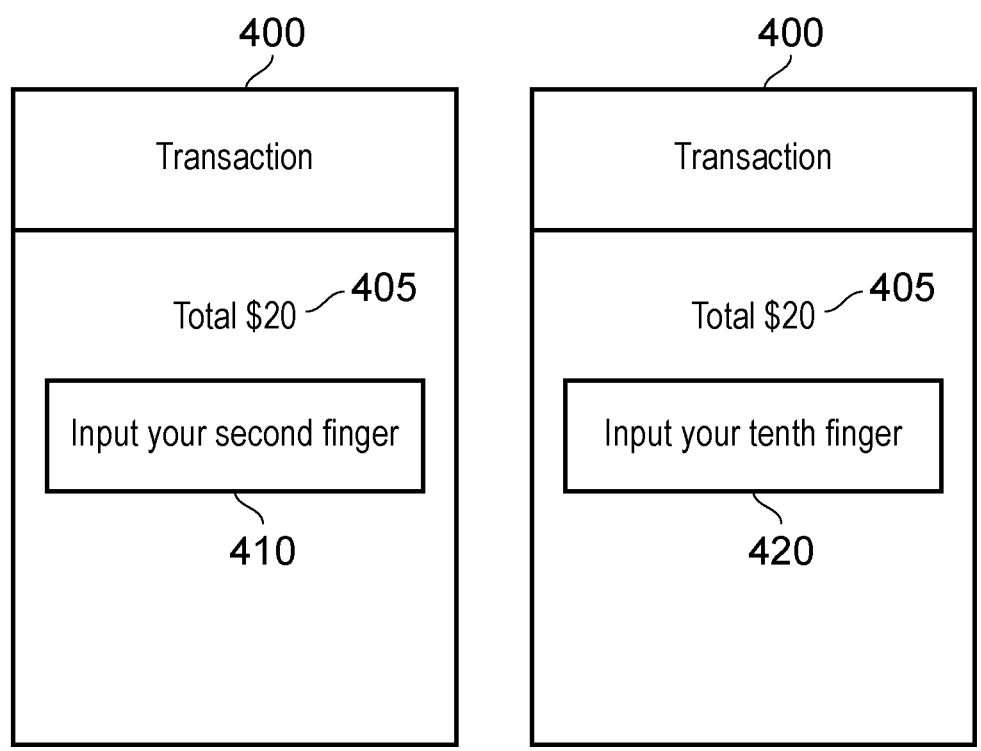
FIG. 4 is a diagram showing an image displaying indicators indicating the user inputs that correspond to the indicated payment amount.

Referring now to FIG. 4, in embodiments of the disclosure the processing circuitry 140 is adapted to determine one or more user inputs that correspond to a user input payment amount that is the same as the indicated payment amount and to generate the image 400 to display one or more indicators 410, 420 indicating the one or more user inputs that correspond to the indicated payment amount 405. Consequently, the user input payment amount is the same as the indicated payment amount if the receiving circuitry receives the one or more user inputs indicated by the one or more indicators The processing circuitry 140 can generate the image 400 to display the indicated payment amount 405 to the user, and the processing circuitry 140 can determine one or more inputs that are required from the user in order to provide a user input payment amount that is the same as the indicated payment amount. For example, the image can display an indicated payment amount of $20 to the user and the processing circuitry 140 can determine which user inputs correspond to a user input payment amount of $20. In this case, the processing circuitry 140 may determine that a biometric input corresponding to the user's second finger and a biometric input corresponding to the user's tenth finger are required in order for the user to provide a user input payment amount that is the same as the indicated payment amount. The processing circuitry 140 can generate the image 400 to display the first indicator 410 and when the user input corresponding to the first indicator is received by the input circuitry 110, the second indicator 420 can be displayed indicating that the next user input is required. Hence more generally, the processing circuitry 140 can determine that a first input is required for the indicated payment amount and the processing circuitry 140 can generate the image to display one or more indicators to the user.

The processing circuitry 140 can therefore determine which user inputs are required from the user based on the value of the indicated payment amount, and the processing circuitry 140 can generate the image to display one or more indicators that indicate the user inputs that are required from the user for the indicated payment amount. Whilst FIG. 4 illustrates the first indicator 410 and the second indicator 420, it will be appreciated that the indicators 410, 420 can take a variety of different forms. For example, the indicator 410 may include the text "input finger X", or the indicator 410 may be customised by the user such that user specific text may be displayed for one or more indicators. For example, the user may choose to customise one or more indicators so that user specific text, such as "present index finger of left hand" or "left index finger", may be displayed to the user for the first indicator. Alternatively or in addition, the user may customise one or more indicators so that a specific image (such as a thumbnail image) may be displayed to the user for the first indicator. This would help to avoid the case where the image 400 always displays indicators having a fixed format such as "finger X", and the respective indicators can be made to be more visually distinctive with respect to each other. Therefore, one or more indicators can be displayed to the user in order to inform the user which user input is required from the user to authorise the transaction for the indicated payment amount. It is assumed that the user has knowledge of what numeral is mapped to each user input (e.g. the user knows that the $1^{st}$ finger is associated with the numeral 1). By viewing an indicator the user can be informed of an amount that they are being requested to input before the user actually provides the user input. For example, the indicator may indicate that the user's first fingerprint is required and the user, knowing that the first fingerprint is mapped to the numeral 1, therefore knows that they are being requested to provide a user input payment amount that starts with a 1.

In embodiments of the disclosure the one or more indicators request the user to provide the one or more user inputs in sequence. The processing circuitry 140 can generate the image (see image 400 in FIG. 4) to display the one or more indicators in order. In this way, a first indicator is displayed to request the user to provide a first user input corresponding to the first indicator, and once the apparatus 100 has received and authenticated the first user input the image can be generated to a second indicator to request the user to provide a second user input corresponding to the second indicator. Therefore, for the arrangement illustrated in FIG. 4, it will be appreciated that the image 400 can be generated to display the first indicator 410 and can then be generated to display the indicator 420 after the user has provided the input for the first indicator.

When the indicator (410 or 420) requests the user to provide a biometric input such as "input your second finger", as shown in FIG. 4, the input circuitry 120 can receive the user input based on a detection of the fingerprint (or a detection of a pattern associated with the finger veins) of the user's second finger, and the authorising circuitry 130 can authenticate the biometric input provided by the user based on pre-registered biometric data that is stored for the user. The authorising circuitry 130 can thus authenticate the biometric inputs in sequence by comparing each biometric input provided by the user with the data corresponding to the biometric input that was requested by the indicator. Consequently, if the indicator requests the user to provide their second finger and the user instead provides another finger, the authorising circuitry 130 will compare the received user input with the biometric data stored for the user's second finger and therefore will not authenticate the user input if the user input does not correspond to the user input requested by the indicator. This provides a more efficient technique for authenticating a user, because the user's biometric input can be compared directly with an expected biometric input without requiring the user's biometric input to be compared with all of the biometric data stored for the user. Hence more generally a biometric input can be requested from the user by the indicator, and the biometric input received by the input circuitry 120 can be authenticated by the authorising circuitry 130 based on whether or not the biometric input matches the pre-registered biometric data for the requested biometric input.

As discussed previously, the authorising circuitry 130 can associate each respective user input with a respective numeral according to the predetermined mapping of one or more user inputs to one or more numerals. When viewing the indicator the user is aware of the specific biometric input that is being requested and the numeral that is associated with that specific biometric input. This means that the user can control which numerals are provided for authenticating the transaction by providing biometric inputs corresponding to numerals. Therefore, rather than entering numerals using a keyboard, this arrangement can allow the user to enter respective numerals based on a correspondence relationship between biometric inputs and numerals, such that each numeral that is provided is authenticated based on biological characteristics of the user which thereby provides enhanced security. Consequently, only biometric inputs that match the user's pre-registered biometric data are capable of providing numerals which form the user input payment amount provided by the user for authorising the transaction.

In embodiments of the disclosure the authorising circuitry 130 is in communication with a secure database comprising biometric data corresponding to the user and the authorising circuitry 130 is adapted to authenticate each of the one or more biometric inputs provided by the user in accordance with the secure database. The secure database can store biometric data registered for the user, which comprises one or more from the list consisting of: one or more fingerprints for the user; one or more iris patterns for the user; one or more retina patterns for the user; and one or more voiceprints for the user. The authorising circuitry 130 can communicate with the secure database via a wireless communication of encrypted information. For example, the secure database may be provided as part of a secure server (e.g. secure payment application server) and the one or more biometric inputs can be communicated from the apparatus 100 to the secure database based on an encrypted communication link. In this way, the biometric inputs received by the apparatus 100 can be communicated to the secure database for authorisation, and the secure database can authenticate each biometric input based on a comparison with the biometric data registered for the user. Based on the result of the authentication processing performed by the secure database, encrypted information can be communicated from the secure database to the authorising circuitry 130. The encrypted information received by the authorising circuitry 130 can then be decrypted by the authorising circuitry 130 to provide an indication of whether a biometric input received by the input circuitry 120 matches the biometric data stored for the user at the secure database.

Hence more generally, the authorising circuitry 130 can communicate encrypted information corresponding to one or more received biometric inputs to the secure database, and the authorising circuitry 130 can receive encrypted information from the secure database indicating whether or not the biometric inputs match the biometric data stored for the user. In this way, the authentication processing can be performed by the secure database and the authorising circuitry 130 can be provided with encrypted information providing a binary indication as to whether or not the biometric input has been authenticated by the secure database. It will be appreciated that the input circuitry 120 which receives the biometric inputs can communicate encrypted information for the biometric inputs to the secure database via a secure communication link, and the secure database can communicate encrypted information based on the result of the authentication processing to the authorising circuitry 130. Alternatively, the input circuitry 120 can receive the one or more biometric inputs and generate encrypted information for the one or more biometric inputs which can be communicated to the authorising circuitry 130 via a wired or wireless communication of encrypted information, and the authorising circuitry 130 can thus perform a secure two-way communication of encrypted information with the secure database.

In embodiments of the disclosure the processing circuitry 140 is adapted to generate the image to display the one or more indicators indicating the one or more user inputs that correspond to the indicated payment amount, and the user input payment amount is the same as the indicated payment amount if the input circuitry 120 receives the one or more user inputs indicated by the one or more indicators. Consequently, if the user provides the one or more user inputs in accordance with the one or more indicators, the user will provide a user input payment amount that is the same as the indicated payment amount. In this way, the indicators can ensure that the user provides a user input payment amount that is the same as the indicated payment amount. As discussed previously, the authorising circuitry 130 will authorise the transaction when the user input payment amount is the same as the requested payment amount. Therefore, the transaction will be authorised by the authorising circuitry 130 provided that the indicated payment amount, which is the same as the user input payment amount, is the same as the requested payment amount. In other words, if the indicated payment amount is $X and the requested payment amount is $Y, the user will provide an input payment amount of $X based on the one or more indicators, and the authorising circuitry will not authorise the transaction because the input payment amount is for $X whereas the requested payment amount is for $Y.

In embodiments of the disclosure the processing circuitry 140 is adapted to determine one or more user inputs that correspond to a user input payment amount that is the same as the requested payment amount and to generate the image to display one or more indicators indicating the one or more user inputs that correspond to the requested payment amount. As discussed previously the application can setup a request for the user to authorise the transaction. The receiving circuitry 110 can be configured to receive the request for authorisation of the transaction which comprises information indicating the requested payment amount for the transaction. Therefore, the processing circuitry 140 can determine one or more user inputs that are required from the user in order to provide a user input payment amount that is the same as the requested payment amount of the transaction.

For example, the receiving circuitry 110 can receive information for a transaction having a requested payment amount of $80. The processing circuitry 140 can determine which user inputs correspond to a user input payment amount of $80, and the image can be generated by the processing circuitry 140 to display one or more indicators indicating the one or more user inputs that are required from the user to provide a user input payment amount of $80. In this case, the processing circuitry 140 may determine that a biometric input corresponding to the user's eighth finger and a biometric input corresponding to the user's tenth finger are required in order for the user to provide a user input payment amount that is the same as the indicated payment amount. Hence more generally, the processing circuitry 140 can determine that a first input is required for the requested payment amount and the processing circuitry 140 can generate the image to display a first indicator to the user.

The processing circuitry 140 can therefore determine which user inputs are required from the user based on the value of the requested payment amount, and the processing circuitry 140 can generate the image to display one or more indicators that indicate the user inputs that are required from the user for the requested payment amount. Therefore, one or more indicators can be displayed to the user in order to inform the user which user input is required from the user to authorise the transaction for the requested payment amount.

It is assumed that the user has knowledge of what numeral is mapped to each user input (e.g. the user knows that the 1st finger is associated with the numeral 1). By viewing an indicator the user can be informed of an amount that they are being requested to input before the user actually provides the user input. For example, the indicator may indicate that the user's first fingerprint is required and the user, knowing that the first fingerprint is mapped to the numeral 1, therefore knows that they are being requested to provide a user input payment amount that starts with a 1. In this way, the user can identify whether the one or more user inputs, which are indicated by the one or more indicators, correspond to a user input payment amount that is the same as the amount expected by the user. Consequently, the user can identify when the amount indicated by the one or more indicators is not the same as the amount the user expected (either based on the amount displayed by the user interface of the application or the indicated payment amount) and the user can decide not to proceed with authorisation of the transaction.

Figure 5:
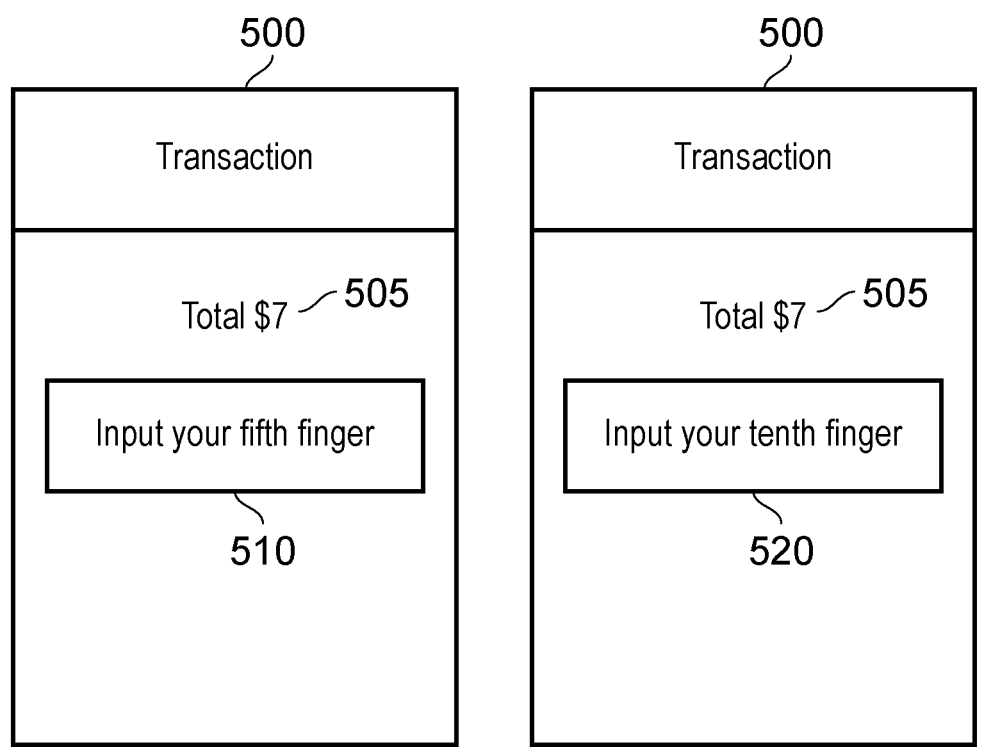
FIG. 5 is a diagram showing an image displaying indicators indicating the user inputs that correspond to the requested payment amount.

Referring now to FIG. 5, in embodiments of the disclosure the one or more indicators indicating the one or more user inputs that correspond to the requested payment amount inform the user of the value of the requested payment amount. In other words the user is informed of the value of the requested payment amount when the user views the one or more indicators 510, 520 indicating the one or more user inputs that correspond to the requested payment amount. The user can view the one or more indicators 510, 520 which indicate the one or more user inputs required from the user to provide a user input payment amount that is the same as the requested payment amount. Therefore, if the indicator indicates that the user is required to provide a first user input corresponding to the numeral 5 and a second user input corresponding to the numeral 0, then the user is informed that the value of the requested payment amount is $50. This means that the user can be informed of the user input payment amount that they are being requested to provide to authorise the transaction for the requested payment amount. As discussed previously for the indicators 410, 420 illustrated in FIG. 4, it will be appreciated that the indicators 510, 520 illustrated in FIG. 5 can take a variety of different forms. The user can therefore decide whether or not to provide the user input when presented with an indicator and the user can decide to terminate the transaction if the one or more indicators indicate that the requested payment amount is not the same as the payment amount that the user expected. In the example shown, the indicators 510, 520 indicate that the user is required to provide the fifth finger and then the tenth finger in order to provide a user input payment amount that is the same as the requested payment amount. The user, knowing the numerals that are associated with the fifth fingerprint and the tenth finger print, therefore knows that they are being requested to provide a user input payment amount of $50. However, the image 500 displays the indicated payment amount 505 having the value $7 (i.e. the user expected to authorise a transaction for $7). Therefore, the user is informed that the requested payment amount of the transaction is not the same as the indicated payment amount 505 and the user is actually being requested to authorise a transaction for $50 rather than $7.

In embodiments of the disclosure the processing circuitry 140 is adapted to determine a number of respective user inputs and an order of the respective user inputs in dependence upon the value of either the indicated payment amount or the requested payment amount according to the predetermined mapping of one or more user inputs to one or more numerals discussed previously. The processing circuitry 140 can determine the one or more user inputs required from the user to provide a user input payment amount that is the same as either the indicated payment amount or the requested payment amount. The predetermined mapping, such as a mapping based on the mapping table illustrated in FIG. 2, can be used to determine which respective user inputs are required from the user according to which user input is mapped to which numeral.

Figure 6:
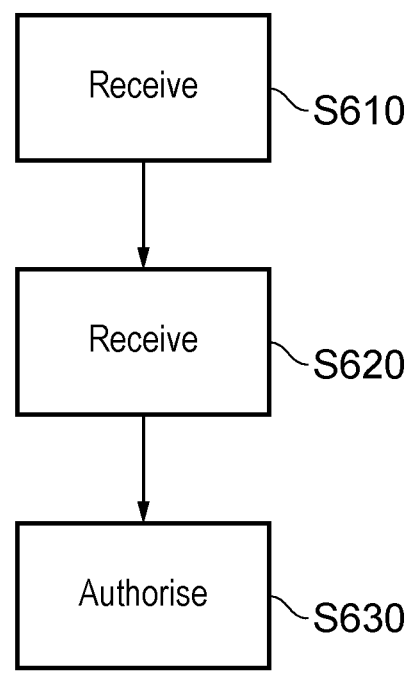
FIG. 6 is a flow diagram of a method of authorising a transaction having a requested payment amount.

Referring now to FIG. 6, in embodiments of the disclosure a method of authorising a transaction having a requested payment amount, comprises:
   a first step S610 of receiving a request to authorise the transaction, the request indicating the requested payment amount of the transaction;
   a second step S620 of receiving one or more user inputs required from the user to authorise the transaction; and
   a third step S630 of authorising the transaction when the one or more user inputs correspond to a user input payment amount that is the same as the requested payment amount of the transaction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation. It will also be appreciated that example embodiments can be implemented by computer software operating on a general purpose computing system. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An apparatus configured to authorise a specific transaction having a requested payment amount, comprising:
   receiving circuitry configured to receive a request to authorise the specific transaction, the request indicating the requested payment amount of the specific transaction;
   input circuitry configured to receive one or more user inputs from a plurality of biometric sources of the user; and
   authorising circuitry configured to:
      associate each respective biometric source with a respective numeral according to a predetermined mapping of the biometric sources to one or more numerals, determine a set of provided numerals based on the biometric sources used for the one or more user inputs, compare the provided numerals to the requested payment amount, to determine whether there is a match, and in response to the match to assert that the specific transaction has been securely authorised by the user, wherein:

in response to the provided numerals instead matching a different requested payment amount from a different transaction, the authorizing circuitry is configured to not assert that the specific transaction was securely authorised by the user, and the input circuitry comprises one or more of the following:

one or more sensors to detect a fingerprint of a user;

one or more image sensors to detect at least one of a retina and an iris of a user; and one or more audio sensors configured to detect a voiceprint of a user.

2. An apparatus according to claim 1, wherein the authorising circuitry is configured to biometrically authenticate each of the one or more user inputs.

3. An apparatus according to claim 1, comprising:

processing circuitry configured to generate an image to display an indicated payment amount of the specific transaction.

4. An apparatus according to claim 3, wherein the processing circuitry is configured to determine one or more user inputs that correspond to a user input payment amount that is the same as the indicated payment amount and to generate the image to display one or more indicators indicating the one or more user inputs that correspond to the indicated payment amount.

5. An apparatus according to claim 3, wherein the processing circuitry is configured to determine one or more user inputs that correspond to a user input payment amount that is the same as the requested payment amount and to generate the image to display one or more indicators indicating the one or more user inputs that correspond to the requested payment amount.

6. An apparatus according to claim 5, wherein the one or more indicators indicating the one or more user inputs that correspond to the requested payment amount inform the user of the value of the requested payment amount.

7. An apparatus according to claim 4, wherein the processing circuitry is configured to determine a number of respective user inputs and an order of the respective user inputs in dependence upon the value of either the indicated payment amount or the requested payment amount according to a predetermined mapping of one or more user inputs to one or more numerals.

8. An apparatus according to claim 1, wherein the mapping is determined by a user defined mapping table.

9. An apparatus according to claim 4, wherein the one or more indicators request the user to provide the one or more user inputs in sequence.

10. An apparatus according to claim 1, wherein the authorising circuitry is in communication with a secure database comprising biometric data corresponding to the user and the authorising circuitry is configured to authenticate each of the one or more user inputs provided by the user in accordance with the secure database.

11. A method of authorising a specific transaction having a requested payment amount, comprising:

receiving, at an apparatus configured to authorise the specific transaction, a request to authorise the specific transaction, the request indicating the requested payment amount of the specific transaction;

receiving, at the apparatus configured to authorise the specific transaction, one or more user inputs required from a plurality of biometric sources of the user;

associating each respective biometric source with a respective numeral according to a predetermined mapping of the biometric sources to one or more numerals;

determining a set of provided numerals based on the biometric sources used for the one or more user inputs;

comparing, at the apparatus configured to authorise the specific transaction, the provided numerals to the requested payment amount;

determining, at the apparatus configured to authorise the specific transaction, whether there is a match between the provided numerals and the requested payment amount; and in response to the match, asserting by the apparatus configured to authorise the specific transaction, that the specific transaction has been securely authorised by the user; and when the one or more provided numerals instead match a different requested payment amount from a different transaction, not asserting by the apparatus configured to authorise the specific transaction that the specific transaction was securely authorised by the user, wherein the user inputs comprise one or more of the following:

a fingerprint of a user detected by one or more sensors to detect;

at least one of a retina and an iris of a user detected by one or more image sensors; and a voiceprint of a user detected by one or more audio sensors.

12. A non-transitory, computer-readable storage device storing software which, when executed by a computer, causes the computer to:

receive, at an apparatus configured to authorise a specific transaction, a request to authorise the specific transaction, the request indicating the requested payment amount of the specific transaction;

receive, at the apparatus configured to authorise the specific transaction, one or more user inputs required from a plurality of biometric sources of the user;

associating each respective biometric source with a respective numeral according to a predetermined mapping of the biometric sources to one or more numerals;

determining a set of provided numerals based on the biometric sources used for the one or more user inputs;

comparing, at the apparatus configured to authorise the specific transaction, the provided numerals to the requested payment amount;

determining, at the apparatus configured to authorise the specific transaction, whether there is a match between the provided numerals and the requested payment amount; and in response to the match, asserting by the apparatus configured to authorise the specific transaction, that the specific transaction has been securely authorised by the user; and when the one or more provided numerals instead match a different requested payment amount from a different transaction, not asserting by the apparatus configured to authorise the specific transaction that the specific transaction was securely authorised by the user, wherein the user inputs comprise one or more of the following:

a fingerprint of a user detected by one or more sensors to detect;
at least one of a retina and an iris of a user detected by one or more image sensors; and
a voiceprint of a user detected by one or more audio sensors.

\* \* \* \* \*